Sept. 12, 1933.    W. S. GURTON ET AL    1,926,334
TANDEM MOUNTING FOR TRUCK AND TRAILER AXLES
Filed Feb. 12, 1931

Inventors.
William S. Gurton.
Joseph Plint.
Herman Nyberg.

Patented Sept. 12, 1933

1,926,334

UNITED STATES PATENT OFFICE 1,926,334

TANDEM MOUNTING FOR TRUCK AND TRAILER AXLES

William S. Gurton, Joseph Plint, and Herman Nyberg, Kitchener, Ontario, Canada, assignors to Dominion Truck Equipment Co. Limited, Kitchener, Ontario, Canada Application February 12, 1931
Serial No. 515,308

5 Claims. (Cl. 280—124)

The principal objects of this invention are to eliminate as far as posible the transmission of vibration from the road surface to the load being transported and to provide an axle suspension particularly applicable to a tandem axle assembly which will afford the maximum flexibility and will absorb much of the vibration caused by travel over rough roads.

The principal feature of the invention consists in the mounting of the wheel supported axles in rubber blocks carried by flexibly supported members whereby the torque rods and springs supporting the axles will be free from the twisting effect caused by the vehicle passing over uneven surfaces, as found in rough roads, whereby the load will float upon a uniformly even support, irrespective of the movement of the wheels over inequalities in the roads.

In the accompanying drawing, Figure 1 is a plan view of a tandem pair of wheels for a truck or trailer structure and their spring supports.

Figure 1:
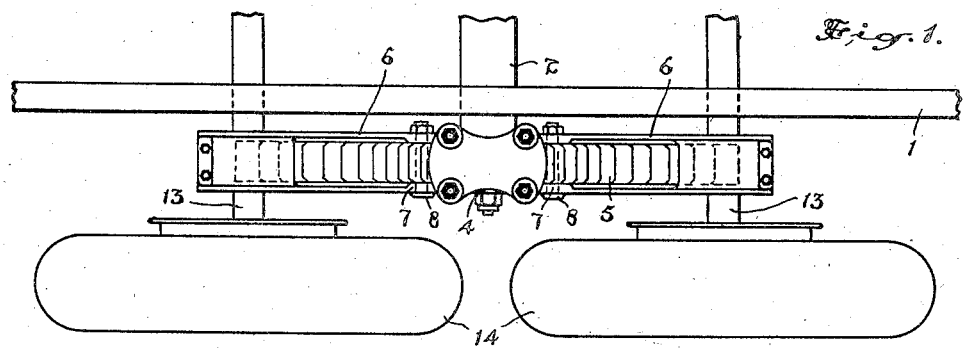
Figure 2:
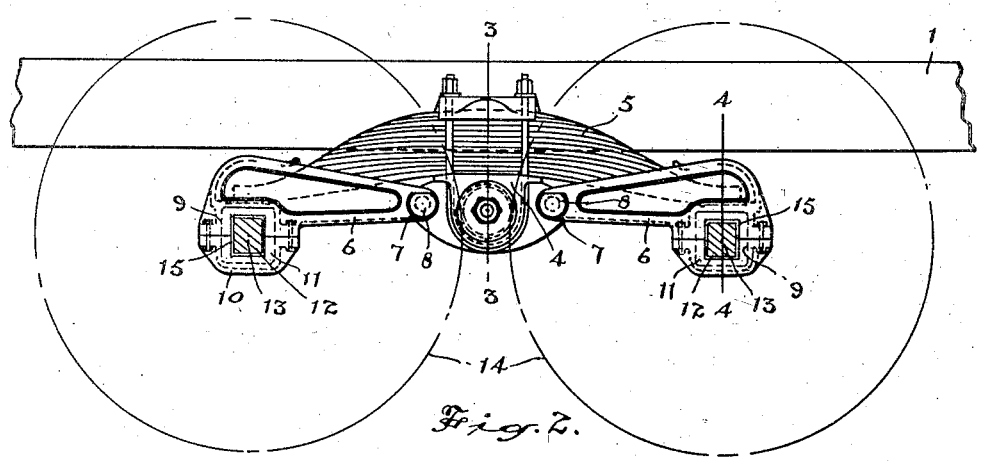
Figure 2 is a side elevational view of the structure illustrated in Figure 1.

In the construction herein shown the truck or trailer frame 1 is mounted on a bracket 2 supported on the tubular axle 3 and on each end of the axle 3 is rotatably mounted a pivot bracket 4 which is connected to the underside of the spring 5.

Torque rods 6 are provided with jaw ends 7 embracing the pivot bracket 4 and pivotally connected thereto by the pins 8. The upper sides of the torque rods are channeled to receive the ends of the spring 5 which rests therein and the under sides of the outward ends of said torque rods are formed with transverse rectangular recesses 9 which are open at the underside and caps 10 having similar rectangular recesses are secured thereto.

Flanges 11 extend around the recesses of the torque rod ends and caps and enclose the rectangular rubber blocks 12 which are moulded around the axles 13 which are supported by the wheels 14.

Figures 3, 4, 5:
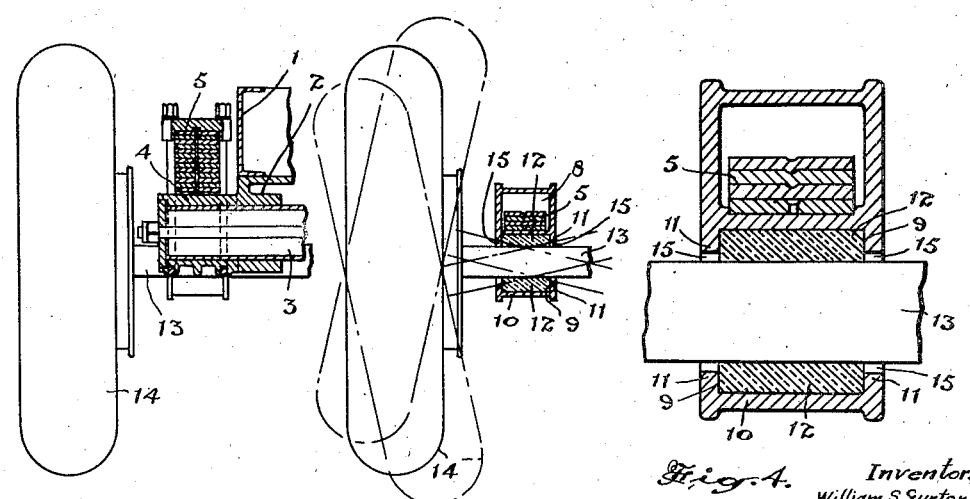
Figure 3 is a vertical section taken on the line 3—3 of Figure 2.
Figure 4 is an enlarged vertical section taken on the line 4—4 of Figure 2.
Figure 5 is a vertical section taken on the line 4—4 of Figure 2 showing the exaggerated positions of the axle due to unequal road conditions.

It will be noted particularly that the flanges 11 are spaced a considerable distance from the axle leaving the orifices 15 at either side of the torque rods so that the rubber blocks will be free to flexibly support said axles as they vibrate through the contact with the inequalities of the road. Such contacts differ from side to side and cause the lifting of the axle at one end or the other and thereby effecting a tilting of the axle which will be permitted through the flexibility of the rubber blocks 12 in a manner illustrated by the exaggerated angular positions of the wheel shown in Figure 5.

The feature of the rubber block connection between the axle and the torque rods not only reduces the vibration transmitted to the springs but it prevents twisting action on the torque rods and supporting springs, thereby eliminating the binding effect otherwise produced and reduces wear and deterioration. The tilting support of the main axle 3 upon the spring and the elimination of twisting strain upon the connecting members between the wheel supported axle and the spring support creates a free floating suspension of the load which not only enhances the life of the structure but creates a very desirable smoothness of travel.

What we claim as our invention is:—

1. In an axle mounting, the combination of an axle rigid with the vehicle frame, a bracket pivotally mounted on said axle, a spring mounted on said pivot bracket, torque rods pivotally connected with said pivotally mounted bracket and engaging the ends of said spring in both pressure and guiding contact, axles extending through said torque rods, and rubber blocks encircling said axles and secured in said torque rods.

2. In an axle mounting, the combination of an axle having a fixed mounting on the vehicle frame, a bracket pivotally mounted on said fixed axle, a spring mounted on said pivot bracket, torque rods pivotally connected at their inner ends with said pivotally mounted bracket and having recessed upper sides to receive and support the ends of said spring, said torque rods terminating in transverse flanged recesses, axles extending through said transverse recesses in said torque rods, and moulded rubber blocks mounted on said axles and enclosed within the flanged recesses of said torque rods.

3. In a mounting for tandem axles, a centre axle rigidly secured to the frame of the vehicle, brackets pivotally mounted on each end of said centre axle, a spring mounted centrally on each of said brackets, torque rods having jaw ends pivotally connected with said pivotal brackets and having the ends of said springs bearing thereon at a point spaced from the jaw ends, the outer ends of said torque rods having rectangular flanged recesses, and axles extending through the rectangular flanged recesses of said torque rods and having mounted thereon rectangular blocks of rubber enclosed between the flanges of and filling the recesses of said torque rods, said axles having freedom of movement within the flanged recesses restricted only by the rubber blocks mounted thereon.

4. A mounting for tandem axles as claimed in claim 1 in which said torque rods carry integral upstanding side flanges which extend longitudinally of the springs to confine the latter therebetween in guiding contact.

5. A mounting for truck and trailer axles, comprising the combination with the vehicle frame, of a spring connected to said frame, a metal casing engaging said spring in pressure contact at a point spaced from its point of connection with the frame and held against free rotation, an axle extending through said casing and of materially lesser cross sectional area than the internal cross section of said casing, a resilient rubber block interposed between said axle and casing, said axle and casing being formed with angular interlocking peripheries co-operating with said resilient block in extensive surface contact to provide an effective resilient tortional interlock between said axle and casing.

W. S. GURTON.
JOSEPH PLINT.
HERMAN NYBERG.